(12) United States Patent
Papirer et al.

(10) Patent No.: US 9,765,762 B2
(45) Date of Patent: Sep. 19, 2017

(54) CRYOGENIC PUMPS

(71) Applicant: CRYOSTAR SAS, Hesingue (FR)

(72) Inventors: Pierre Papirer, Reiningue (FR); Stephane Sgambati, Balderscheim (FR)

(73) Assignee: Cryostar SAS, Hesingue (FR)

( * ) Notice: Subject to any disclaimer, the term of this patent is extended or adjusted under 35 U.S.C. 154(b) by 254 days.

(21) Appl. No.: 14/360,350

(22) PCT Filed: Nov. 26, 2012

(86) PCT No.: PCT/IB2012/002468
§ 371 (c)(1),
(2) Date: May 23, 2014

(87) PCT Pub. No.: WO2013/080006
PCT Pub. Date: Jun. 6, 2013

(65) Prior Publication Data
US 2015/0013351 A1   Jan. 15, 2015

(30) Foreign Application Priority Data
Nov. 29, 2011 (EP) ..................................... 11290549

(51) Int. Cl.
*F04B 37/00* (2006.01)
*F04B 15/08* (2006.01)
(Continued)

(52) U.S. Cl.
CPC ............. *F04B 15/08* (2013.01); *F04B 37/08* (2013.01); *F04B 37/10* (2013.01); *F04B 53/08* (2013.01);
(Continued)

(58) Field of Classification Search
CPC ................ F04B 2015/081; F04B 37/08; F04B 2015/082; F04B 2015/0822; F04B 37/085; F04B 53/08; F17C 2227/015
See application file for complete search history.

(56) References Cited

U.S. PATENT DOCUMENTS 3,456,595 A    7/1969  Gottzmann et al.
3,630,639 A *  12/1971 Duron ..................... F04B 15/08
                                                         417/435
(Continued)

FOREIGN PATENT DOCUMENTS

FR            929 920 A        1/1948

OTHER PUBLICATIONS

International Search Report for PCT/IB2012/002468, dated Apr. 3, 2013, Authorized Officer: Nikolaos Fistas, 3 pp.; and Written Opinion.

*Primary Examiner* — Charles Freay
*Assistant Examiner* — Christopher Bobish
(74) *Attorney, Agent, or Firm* — Joshua L. Cohen

(57) ABSTRACT

A reciprocating cryogenic pump 2 comprises a piston reciprocable within a pumping chamber 44. The pumping chamber 44 has an inlet suction valve 48 for cryogenic liquid to be pumped and an outlet 32 for high pressure cryogenic liquid. The inlet valve 48 for the cryogenic liquid communicates with a cryogenic liquid reception chamber 46 in the cold end or head 6 of the pump 2. The pump head 6 is at least partially surrounded by a first jacket 8 retaining primary vacuum insulation. The first jacket 8 is itself at least partly surrounded by a second jacket 10. The jacket 10 defines a chamber for the reception of a coolant fluid such as liquid nitrogen and the second jacket has an inlet 20 and an outlet 22 for the liquid nitrogen. The thermal insulation can be further enhanced by a trapped gas space 73 between the first (Continued)

jacket 8 and an inner sleeve 52, the latter defining with an outer sleeve 50 vacuum insulation for the pumping chamber 44.

6 Claims, 3 Drawing Sheets

(51) Int. Cl.
*F04B 37/08* (2006.01)
*F04B 37/10* (2006.01)
*F04B 53/08* (2006.01)
*F04B 53/20* (2006.01)
*F17C 9/00* (2006.01)

(52) U.S. Cl.
CPC ............... *F04B 53/20* (2013.01); *F17C 9/00* (2013.01); *F04B 2015/0822* (2013.01); *F04B 2015/0824* (2013.01); *F17C 2227/015* (2013.01); *F17C 2227/0142* (2013.01); *Y10T 137/794* (2015.04)

(56) References Cited

U.S. PATENT DOCUMENTS

| | | | | |
|---|---|---|---|---|
| 4,239,460 | A * | 12/1980 | Golz | F04B 3/003 417/251 |
| 4,447,195 | A | 5/1984 | Schuck | |
| 5,511,955 | A * | 4/1996 | Brown | F04B 15/08 417/259 |
| 5,575,626 | A | 11/1996 | Brown et al. | |
| 5,974,809 | A | 11/1999 | Wooster et al. | |
| 6,220,037 | B1 * | 4/2001 | Heilman | F04B 15/08 417/901 |
| 6,589,027 | B2 * | 7/2003 | Ursan | F03C 1/0076 417/398 |
| 6,659,730 | B2 * | 12/2003 | Gram | F04B 15/08 417/53 |
| 2005/0086949 | A1 | 4/2005 | Noble et al. | |
| 2007/0000259 | A1 | 1/2007 | Brook et al. | |

* cited by examiner

CRYOGENIC PUMPS

This invention relates to a cryogenic pump and particularly to a cryogenic reciprocating pump.

Cryogenic pumps are well known and are becoming increasingly used in industry. In one example, motor vehicles are now using hydrogen as a fuel. Some such vehicles are adapted to store hydrogen in liquid state. There is therefore a need for liquid hydrogen filling stations analogous to conventional petrol or gasoline filling stations. Such filling stations need to be equipped with cryogenic pumps which are capable of generating high pressures up to, for example, seven hundred bar gauge in order to transfer liquid hydrogen from a central reservoir to the storage tank of each motor vehicle that is filled. A number of practical problems arise, however, in pumping cryogenic liquids, particularly liquid hydrogen and liquid helium. One particular problem is a tendency for cavitation within the pump as a result of vaporisation of the cryogenic liquid as a result of absorption of heat from the environment. Cavitation can result in damage to the pump itself and may also hinder the actual pumping of the cryogenic liquid from the storage tank.

A conventional reciprocating cryogenic pump typically has an elongate housing in which a piston is caused to reciprocate in a pumping chamber having an inlet and an outlet for the cryogenic liquid. The inlet communicates with a cryogenic liquid reception chamber in the head of the pump. Even though it is known to insulate thermally the head of the pump, cavitation can occur, particularly during start-up of the pump.

According to the present invention there is provided a reciprocating cryogenic pump comprising a piston reciprocal within a pumping chamber; an inlet to the pumping chamber for cryogenic liquid to be pumped; an outlet from the pumping chamber for high pressure cryogenic liquid; a cryogenic liquid reception chamber in a pump head for the reception of cryogenic liquid from a source thereof, the cryogenic liquid reception chamber including a degassing outlet for evacuating vaporised cryogenic liquid from the reception chamber during cool down, wherein the said pump head is at least partly surrounded by a first jacket retaining vacuum insulation, and the first jacket is itself at least partly surrounded by a second jacket, the second jacket defining a chamber for receiving a coolant fluid, the second jacket having an inlet and an outlet for the coolant fluid.

Typically, a cryogenic reciprocating pump according to the invention has one or more of the following additional features:
an inlet suction valve intermediate the reception chamber and the pumping chamber for permitting the passage of cryogenic liquid from the reception chamber to the pumping chamber;
a filter in the reception chamber for the purpose of limiting the ingress of solid particles from outside the pump to the pumping chamber:
a vacuum-insulating jacket for the pumping chamber.

If desired, the degassing outlet may communicate with a gaseous phase within a storage tank that acts as the source of the cryogenic liquid. Accordingly, vapour of the cryogenic liquid that is created during cool down of the pump is not lost.

The vacuum-insulating jacket may comprise an inner sleeve and an outer sleeve defining therebetween a vacuum-insulating space. Preferably, there is defined intermediate the said inner sleeve and the said first jacket a sealed annular gas space.

A reciprocating cryogenic pump according to the invention will now be described by way of example with reference to the accompanying drawings, in which.

The drawings are not to scale.

Figure 1:
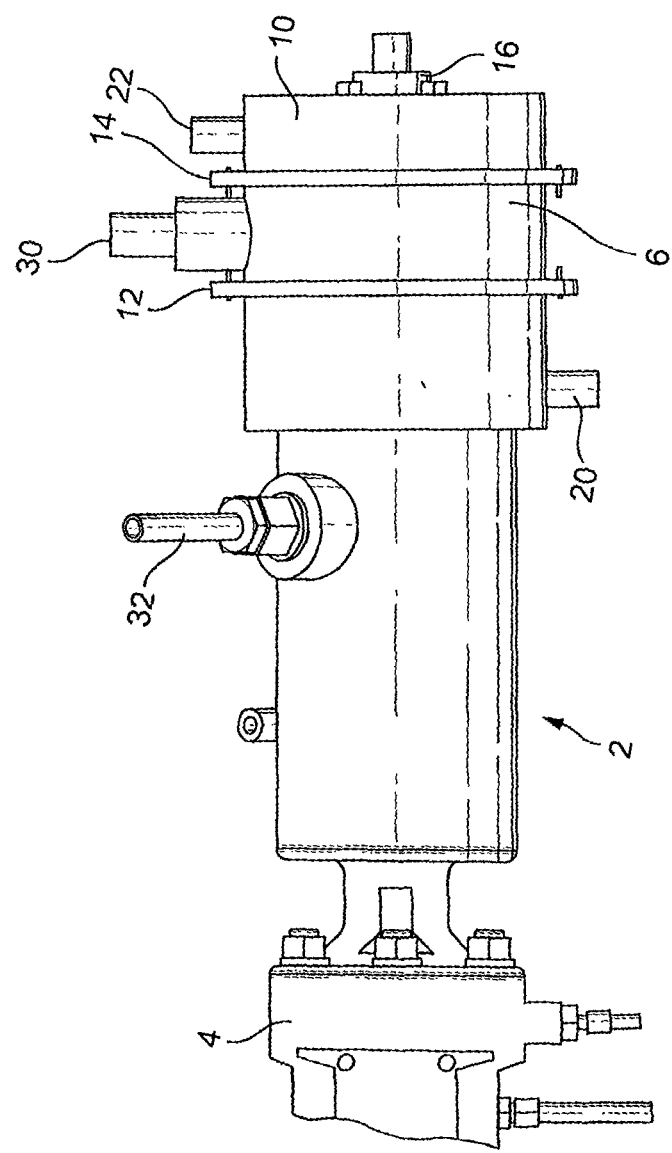
FIG. 1 is a general perspective view of the pump.

Referring to FIG. 1, a cryogenic reciprocating pump 2 is generally of a cylindrical configuration. The pump 2 is shown disposed at a small angle to the horizontal, but may have any orientation. The pump has a warm end 4 and a cold end (or head) 6. At the warm end 4 of the pump 2 there is provided means (not shown) for driving a piston within the pump 2. Typically, an electrical drive is employed, but a hydraulic, pneumatic or mechanical drive could alternatively be used. The arrangements for driving the pump are conventional and need not be described further herein.

Figure 2:
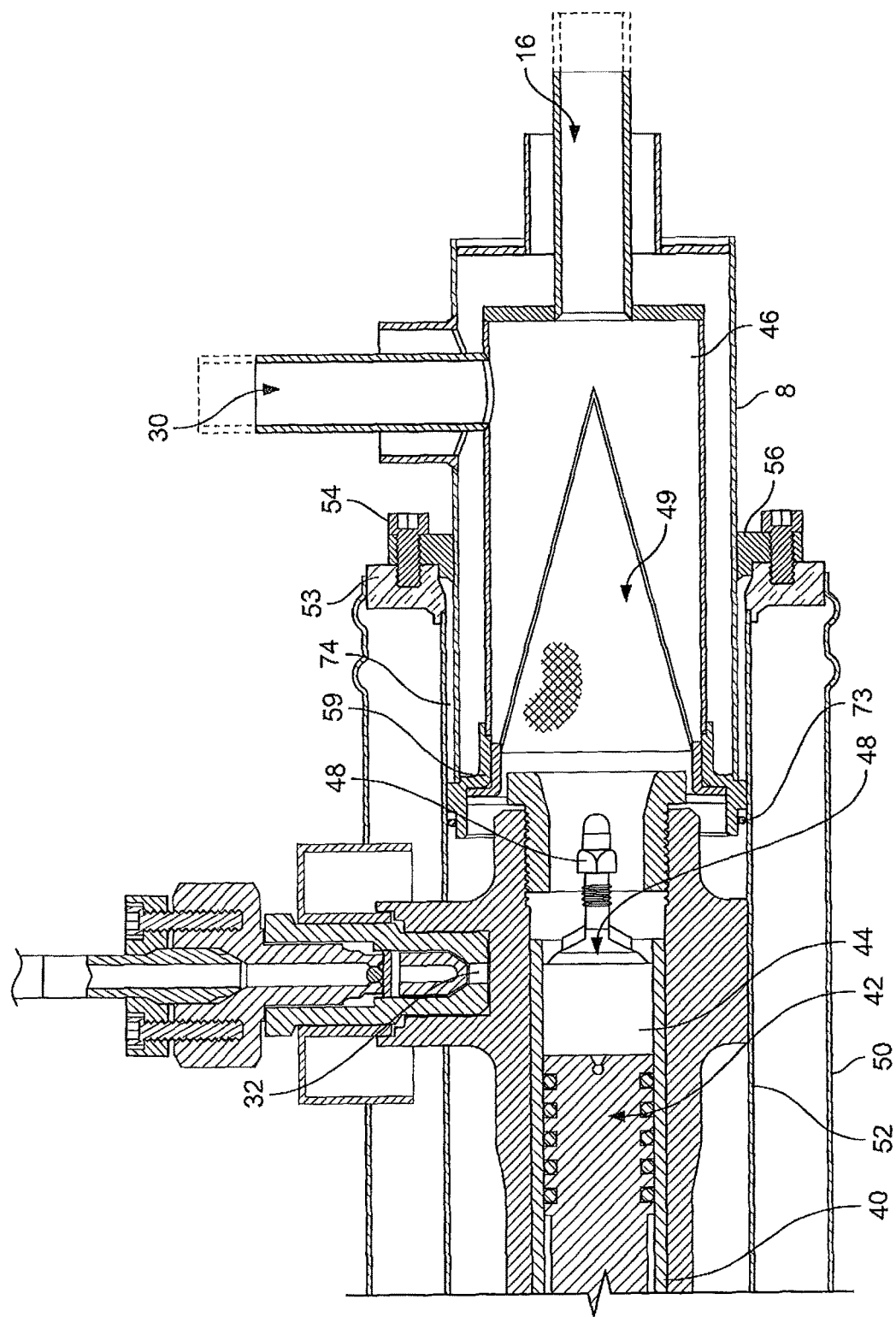
FIG. 2 is a side elevation, partly in section, of the cold end of the pump shown in FIG. 1, but with the second jacket omitted.
Figure 3:
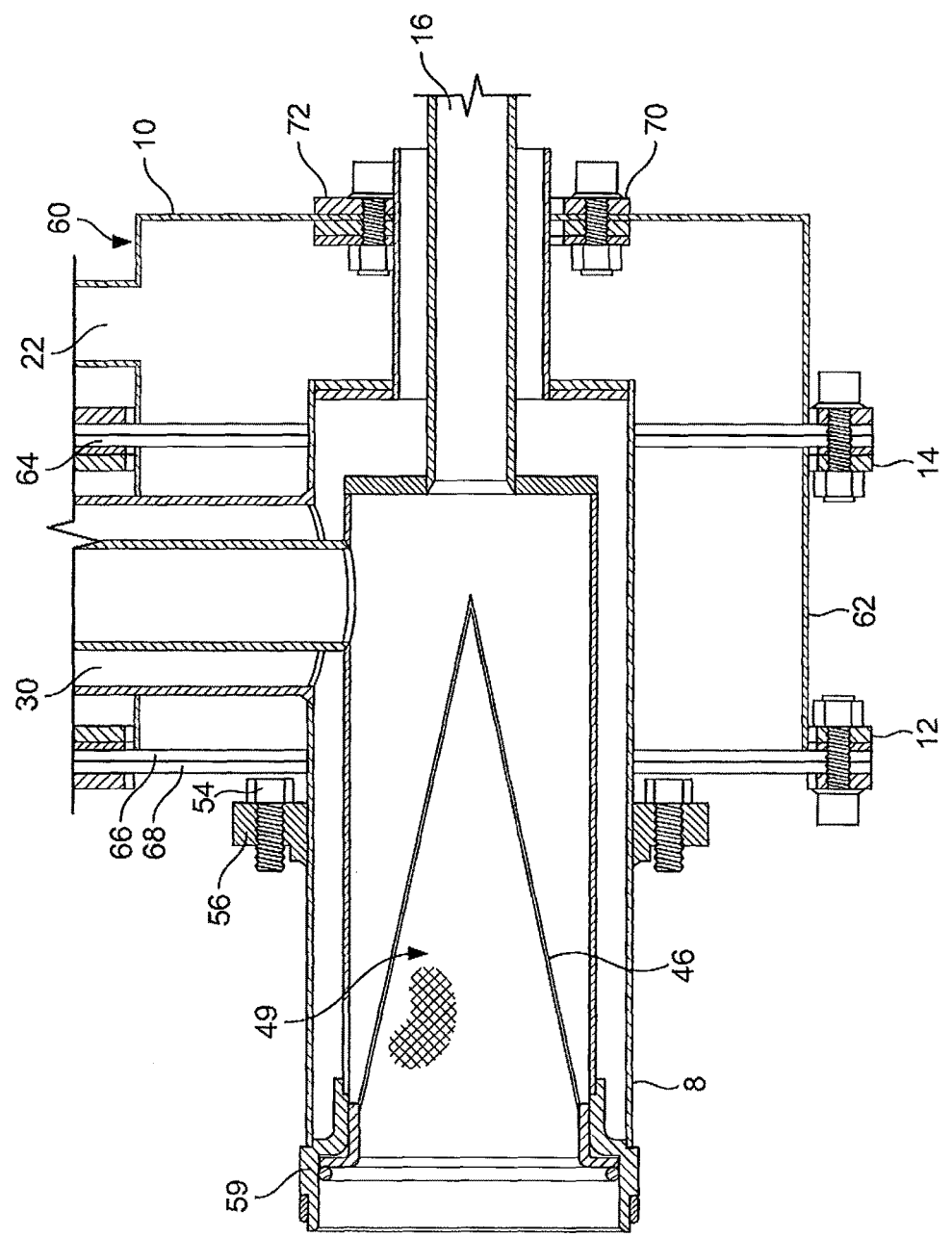
FIG. 3 is a schematic side elevation, partly in section, of the cold end suction head of the pump shown in FIGS. 1 and 2 with the second jacket included.

At the cold end (head) 6 of the pump 2, there is provided a first jacket 8 (see FIGS. 2 and 3) retaining primary vacuum insulation and a second jacket 10 surrounding the distal end of the first jacket 8. The second jacket 10 defines a chamber for the reception of a coolant fluid, typically liquid nitrogen. The second jacket 10 has a proximal end which is provided at a first flange 12. The second jacket 10 is typically formed of two adjacent parts joined together by a second flange 14. Further details of the configuration of the second jacket 10 will be described below with reference to FIG. 3. The head or cold end 6 of the pump 2 ends in a vacuum-insulated nozzle 16 which extends from the distal end of the pump 2. The nozzle 16 is adapted to be connected to a first length of hose communicating with the source of liquid hydrogen or liquid helium (not shown). The second jacket 10 has an inlet 20 to a source of cryogenic coolant, for example liquid nitrogen, and an outlet 22 for the vapour of that coolant. The pump 2 also has a degassing outlet connection 30 for vaporised helium or hydrogen, typically connected by a length of hose (not shown) to the source of liquid hydrogen or helium to be pumped. The pump 2 additionally has an outlet 32 for the high pressure liquid hydrogen or helium The internal arrangements of the pump 2 are shown in FIGS. 2 and 3. The pump 2 is provided with a cylinder 40 in which a piston 42 reciprocates, in operation of the pump. The cylinder 40 and the piston 42 define there between a pumping chamber 44 which communicates with the outlet 32 for pumped liquid hydrogen or liquid helium. Admission of liquid hydrogen or liquid helium to the pump is by means of the nozzle 16. The nozzle 16 leads the liquid hydrogen or liquid helium into a cryogenic liquid reception chamber 46 which is in in-line communication with the pumping chamber 44 through an inlet suction valve 48. The reception chamber 46 also communicates with the degassing outlet connection 30. Passage of the liquid hydrogen or liquid helium from the reception chamber 46 to the pumping chamber 44 is through a generally conical filter 49 adapted to retain within the reception chamber 46 any solid particles that might cause damage to the moving parts of the pump 2. The reception chamber 46 is surrounded by the first jacket 8. The first jacket 8 extends around all but the tip of the nozzle 16 so as to provide the vacuum insulation for the nozzle 16. The cylinder 40 is also provided with vacuum-insulation. In order to provide this vacuum insulation the pump 2 has an inner sleeve 52 and an outer sleeve 50. The space between the sleeves 50 and 52 is maintained in an evacuated state. The sleeves 50 and 52 are provided with a vacuum tight closure 53 to which is secured by bolts 54 a mounting 56 for the first jacket 8. A vacuum tight sealing arrangement 59 is also provided between the proximal end of the reception chamber 46 and the first jacket 8.

A plastics seal 73 (typically of a PIFE compound) is present between the first jacket 8 and the sleeve 52 in order to obtain an insulating gas phase in closed space 74. The seal permits a small quantity of cryogenic liquid into the space 74 in operation of the pump. This liquid vaporises and the resulting gas is trapped. The static gas contributes to the thermal insulation of the reception chamber 46.

The second jacket 10 is shown in FIG. 3. The second jacket 10 surrounds those parts of the first jacket 8 insulating the proximal end of the nozzle 16, the distal end of the reception chamber 46 and the outlet 30. As shown in FIG. 1, the second jacket 10 is formed of two main sections 60 and 62. The two sections 60 and 62 are joined together by means of the second flange 14 which compresses a suitable seal 64. The second jacket 10 is closed by a back plate 66 which is secured in position by means of the first flange 12, a suitable seal 68 being provided between the back plate 66 and the first flange 12. The second jacket 10 is secured to the vacuum insulation surrounding the nozzle 16 by means of a further flange 70 provided with a suitable sealing means 72. The second jacket 10 defines a chamber 11 for a cryogenic coolant such as liquid nitrogen. The cryogenic coolant is admitted through the inlet 20 (shown in FIG. 1) and typically fills the chamber 11 defined by the second jacket 10 nearly to its top (as shown in FIG. 3). Resulting nitrogen vapour flows out of the second jacket 10 through the outlet 22.

In operation of the pump 2, the second jacket 10 is filled with cryogenic liquid (liquid nitrogen) at a temperature of −196° C. and at atmospheric pressure in order to cool down the cold end 6 prior to admission of the liquid helium or liquid hydrogen. It is to be appreciated that in the case of liquid hydrogen the pump typically has to be cooled from a temperature of +20° C. to −266° C. In the case of liquid helium an even lower pumping temperature is required. By using liquid nitrogen to effect the precooling of the cold end 6 of the pump 2 losses of liquid hydrogen or liquid helium are reduced and the total time taken to effect cool down is reduced. Once the temperature of the chamber defined by the second jacket 10 has reached −196° C., which is indicated by a substantially reduced rate of vaporisation of nitrogen, in comparison with that that occurs at the start of the cool down procedure, reciprocation of the piston 42 may be started so as to draw liquid hydrogen or liquid helium from a source (not shown) thereof into the reception chamber 46 and from there through the inlet valve into the pumping chamber 44 in which its pressure is increased to a chosen value which can be up to 700 bar. The resulting pressurised liquid hydrogen or liquid helium is discharged from the pump through the outlet 32. Preferably, the supply of liquid nitrogen to the interior of the second jacket is maintained during pumping of the liquid helium or liquid hydrogen in order to enhance the thermal insulation provided during pumping and to keep down the occurrence of cavitation in the pump.

The invention claimed is:

1. A reciprocating cryogenic pump including a pump head, comprising:
   a pumping chamber and a piston reciprocable within the pumping chamber;
   an inlet to the pumping chamber for receiving cryogenic liquid;
   an outlet from the pumping chamber for discharging high pressure cryogenic liquid; and
   a cryogenic liquid reception chamber in the pump head for receiving the cryogenic liquid, the cryogenic liquid reception chamber including:
      a degassing outlet for evacuating vaporised cryogenic liquid from the cryogenic liquid reception chamber during cool down,
      a first jacket retaining an insulation and partially surrounding said pump head, and
      a second jacket partially surrounding the first jacket and a distal end of said cryogenic liquid reception chamber, the second jacket defining a chamber for receiving a coolant fluid and including an inlet and an outlet for the coolant fluid.

2. The cryogenic pump according to claim 1, further comprising an inlet suction valve intermediate the cryogenic liquid reception chamber and the pumping chamber for permitting passage of the cryogenic liquid from the cryogenic liquid reception chamber to the pumping chamber.

3. The cryogenic pump according to claim 1, further comprising a filter disposed in the cryogenic liquid reception chamber for retaining solid particles in the reception chamber.

4. The cryogenic pump according to claim 1, wherein the pumping chamber further comprises an inner sleeve and an outer sleeve defining therebetween a vacuum-insulating space.

5. The cryogenic pump according to claim 4, further comprising an annular gas space sealed intermediate the inner sleeve and the first jacket.

6. The cryogenic pump according to claim 1, wherein the degassing outlet is in fluid communication with a gaseous phase of the cryogenic liquid from a storage tank source.

* * * * *